US008107218B2

(12) United States Patent
Antonov et al.

(10) Patent No.: US 8,107,218 B2
(45) Date of Patent: Jan. 31, 2012

(54) CAPACITORS

(75) Inventors: Vassil Antonov, Boise, ID (US);
Vishwanath Bhat, Boise, ID (US);
Chris Carlson, Nampa, ID (US)

(73) Assignee: Micron Technology, Inc., Boise, ID (US)

( * ) Notice: Subject to any disclaimer, the term of this patent is extended or adjusted under 35 U.S.C. 154(b) by 379 days.

(21) Appl. No.: 12/476,948

(22) Filed: Jun. 2, 2009

(65) Prior Publication Data

US 2010/0302705 A1     Dec. 2, 2010

(51) Int. Cl.
*H01G 4/06* (2006.01)
(52) U.S. Cl. ........ 361/313; 361/303; 361/315; 361/311; 361/306.3; 361/321.4
(58) Field of Classification Search .................. 361/311, 361/315, 303, 306.3, 313, 321.5; 257/532, 257/306, 310; 427/79
See application file for complete search history.

(56) References Cited

U.S. PATENT DOCUMENTS

| | | | |
|---|---|---|---|
| 6,072,689 A | 6/2000 | Kirlin | |
| 6,075,691 A | 6/2000 | Duenas et al. | |
| 6,483,194 B2 | 11/2002 | Sakao | |
| 6,824,586 B2 | 11/2004 | Omori et al. | |
| 7,294,543 B2 | 11/2007 | Cheng et al. | |
| 7,666,752 B2 * | 2/2010 | Kudelka et al. | ............... 438/381 |
| 2003/0147203 A1 | 8/2003 | Naito et al. | |
| 2003/0179521 A1 * | 9/2003 | Girardie | ............... 361/15 |
| 2004/0087081 A1 | 5/2004 | Aitchison et al. | |
| 2007/0285876 A1 | 12/2007 | Takatani et al. | |

FOREIGN PATENT DOCUMENTS

| | | |
|---|---|---|
| JP | 2002-173371 | 6/2002 |
| KR | 10-0621542 | 9/2006 |
| WO | WO PCT/US2010/033782 | 12/2010 |

* cited by examiner

*Primary Examiner* — Nguyen Ha
*Assistant Examiner* — Hung Dang
(74) *Attorney, Agent, or Firm* — Wells St. John P.S.

(57) ABSTRACT

Some embodiments include methods of forming capacitors. A metal oxide mixture may be formed over a first capacitor electrode. The metal oxide mixture may have a continuous concentration gradient of a second component relative to a first component. The continuous concentration gradient may correspond to a decreasing concentration of the second component as a distance from the first capacitor electrode increases. The first component may be selected from the group consisting of zirconium oxide, hafnium oxide and mixtures thereof; and the second component may be selected from the group consisting of niobium oxide, titanium oxide, strontium oxide and mixtures thereof. A second capacitor electrode may be formed over the first capacitor electrode. Some embodiments include capacitors that contain at least one metal oxide mixture having a continuous concentration gradient of the above-described second component relative to the above-described first component.

8 Claims, 7 Drawing Sheets

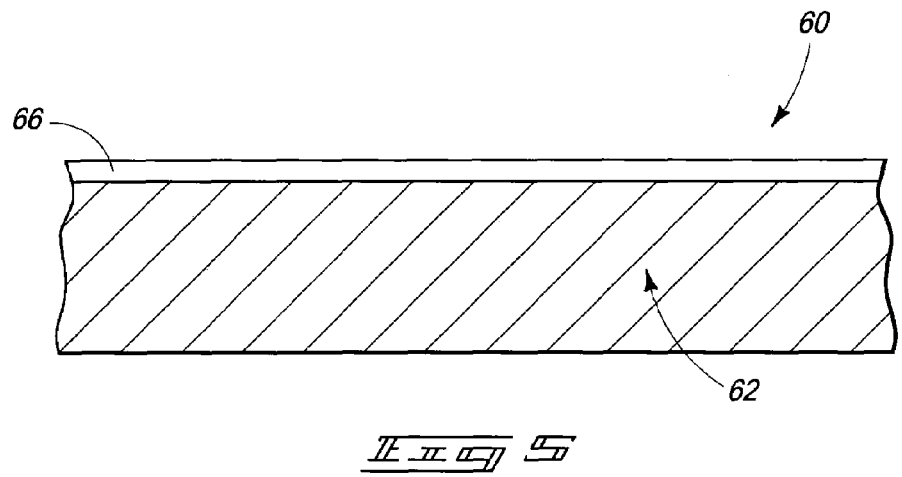
_FIG 5_
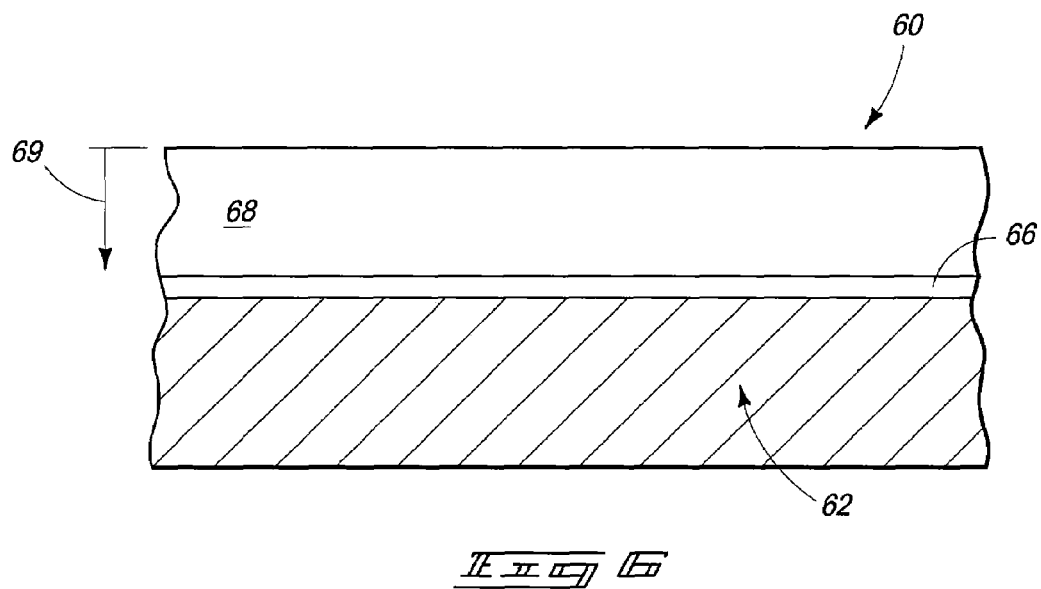
_FIG 6_

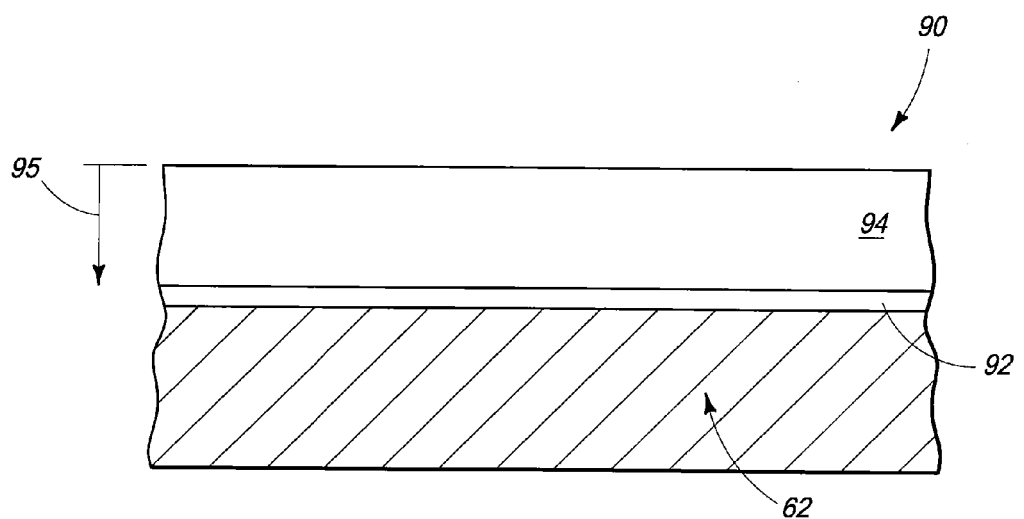
_Fig. 8_
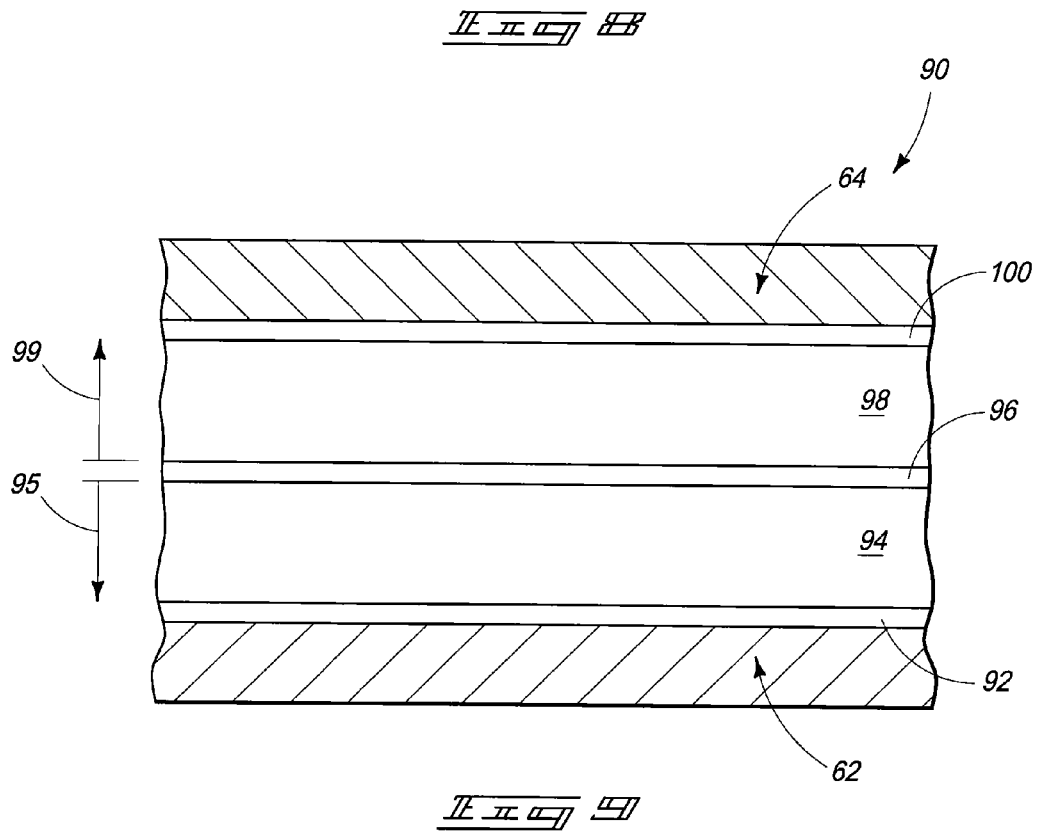
_Fig. 9_

CAPACITORS

TECHNICAL FIELD

Capacitors, and methods of forming capacitors.

BACKGROUND

Capacitors have many applications in integrated circuitry. For instance, dynamic random access memory (DRAM) unit cells may comprise a capacitor in combination with a transistor. Charge stored on the capacitors of the DRAM unit cells may correspond to memory bits.

A continuing goal of integrated circuit fabrication is to decrease the area consumed by individual circuit components, and to thereby increase the density of components that may be provided over a single chip (in other words, to increase the scale of integration). Thus, there is a continuing goal to miniaturize the various components utilized in integrated circuitry.

A problem that may occur during the miniaturization of capacitors is that smaller capacitors may have correspondingly less capacitance than larger capacitors. The amount of charge that may be stored on individual capacitors may be proportional to capacitance, and there may be a minimum capacitance per cell that is required for reliable memory operation. Accordingly, it is often not practical to simply scale-down the size of existing capacitors to achieve capacitors suitable for future generations of integrated circuitry. Rather, the miniaturized capacitors will not meet desired performance parameters unless new materials are developed which improve capacitance within the miniaturized capacitors.

One method of increasing capacitance is to decrease the thickness of dielectrics utilized in the capacitors. However, current leakage becomes problematic with decreasing dielectric thickness.

It would be desirable to develop improved integrated circuit capacitors having desired capacitance, and not having problematic leakage.

BRIEF DESCRIPTION OF THE DRAWINGS

FIGS. 5-7 are diagrammatic cross-sectional side views of a construction shown at various process stages of an example embodiment method of forming a capacitor.

FIGS. 8 and 9 are diagrammatic cross-sectional side views of a construction shown at various process stages of another example embodiment method of forming a capacitor.

DETAILED DESCRIPTION OF THE ILLUSTRATED EMBODIMENTS

Figure 1:
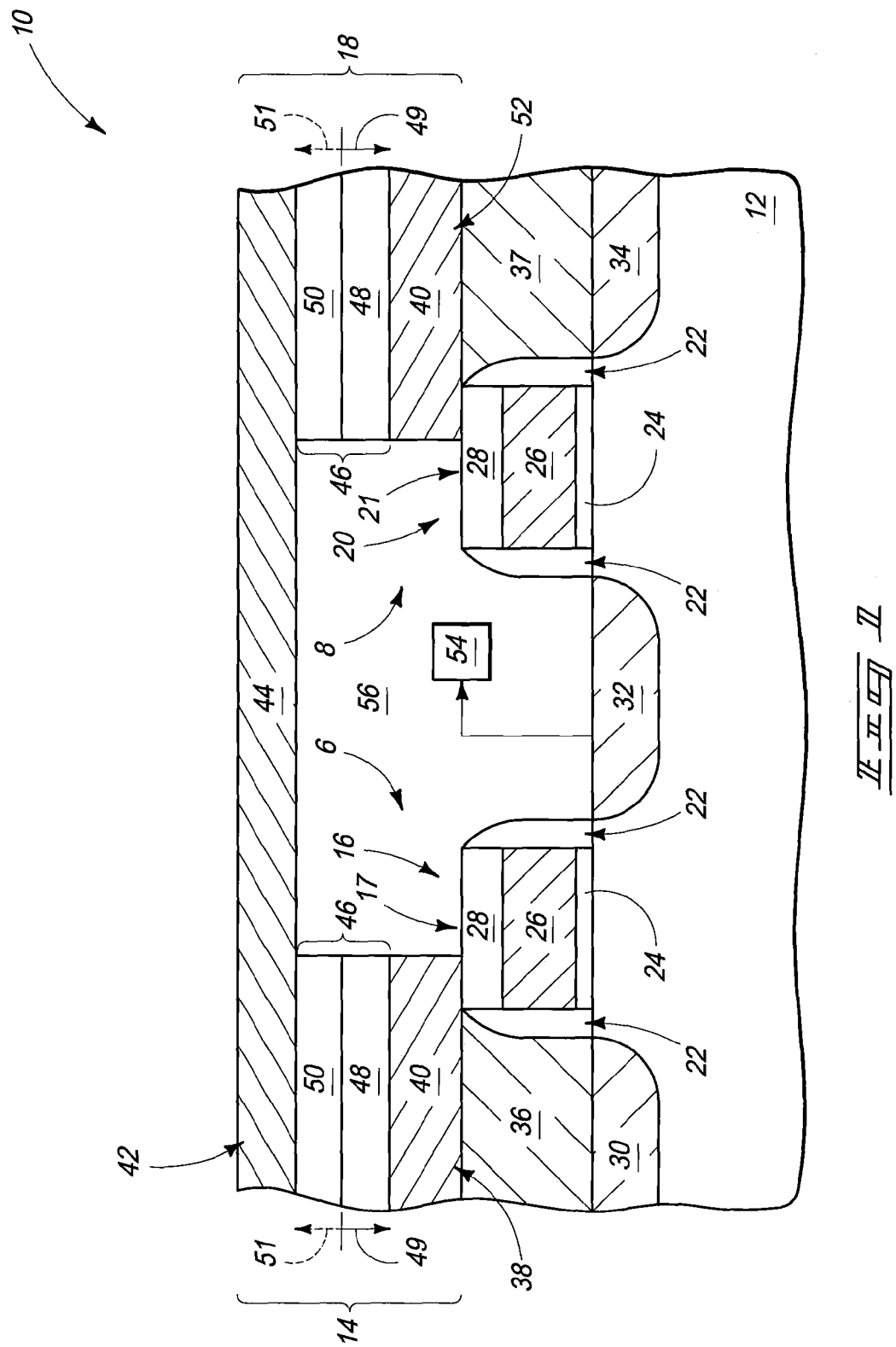
FIG. 1 is a diagrammatic cross-sectional side view of a semiconductor construction showing a pair of DRAM unit cells.

FIG. 1 shows a portion of a construction 10 comprising a pair of DRAM unit cells 6 and 8 supported by a semiconductor substrate 12.

Substrate 12 may comprise, consist essentially of, or consist of, for example, monocrystalline silicon lightly-doped with background p-type dopant. The terms "semiconductive substrate" and "semiconductor substrate" mean any construction comprising semiconductive material, including, but not limited to, bulk semiconductive materials such as a semiconductive wafer (either alone or in assemblies comprising other materials thereon), and semiconductive material layers (either alone or in assemblies comprising other materials). The term "substrate" means any supporting structure, including, but not limited to, the semiconductive substrates described above.

The DRAM unit cells comprise capacitors in combination with transistors. Specifically, unit cell 6 comprises a capacitor 14 in combination with a transistor 16, and unit cell 8 comprises a capacitor 18 in combination with a transistor 20.

Transistors 16 and 20 comprise gates 17 and 21, respectively. The gates include stacks containing gate dielectric material 24, electrically conductive material 26, and an electrically insulative capping material 28. The materials 24, 26 and 28 may comprise conventional materials. For instance, gate dielectric material 24 may comprise silicon dioxide; conductive material 26 may comprise one or more of various metals, metal-containing compounds, and conductively-doped semiconductor materials; and capping material 28 may comprise one or more of silicon dioxide, silicon nitride and silicon oxynitride. In some embodiments, the gates may be portions of wordlines that extend in and out of the page relative to the cross-sectional view of FIG. 1.

Sidewall spacers 22 are along the sidewalls of gates 17 and 21. The sidewall spacers may comprise conventional materials; and may, for example, comprise one or more of silicon dioxide, silicon nitride and silicon oxynitride.

The transistor 16 comprises a pair of source/drain regions 30 and 32 on opposing sides of gate 17; and similarly the transistor 20 comprises source/drain regions 32 and 34 on opposing sides of gate 21. In the shown embodiment, source/drain region 32 is shared by the adjacent transistors 16 and 20. The source/drain regions may correspond to conductively-doped diffusion regions extending into semiconductor material of substrate 12.

In the shown embodiment, an electrically conductive pedestal 36 is provided over source/drain region 30 and in electrical connection to source/drain region 30; and similarly an electrically conductive pedestal 37 is provided over source/drain region 34 and in electrical connection with source/drain region 34. The pedestals 36 and 37 may comprise any suitable electrically conductive compositions or combinations of electrically conductive compositions. For instance, the pedestals 36 and 37 may comprise one or more of various metals, metal-containing compounds, and conductively-doped semiconductor materials.

Capacitor 14 comprises a storage node electrode 38 in electrical connection with pedestal 36. The storage node electrode is shown to homogeneously comprise a single material 40. In other embodiments (not shown), the storage node electrode may comprise multiple different materials. The shown material 40 may comprise any suitable electrically conductive composition or combination of compositions; and may, for example, comprise one or more of various metals, metal-containing compounds, and/or conductively-doped semiconductor materials. In some embodiments, material 40 may comprise, consist essentially of, or consist of titanium nitride.

Capacitor 14 also comprises a plate electrode 42. The plate electrode is shown to homogeneously comprise a single material 44. In other embodiments (not shown), the plate electrode may comprise multiple different materials. The shown material 44 may comprise any suitable electrically conductive composition or combination of compositions; and may, for example, comprise one or more of various metals, metal-containing compounds, and/or conductively-doped semiconductor materials. In some embodiments, material 44 may comprise, consist essentially of, or consist of titanium nitride.

The storage node electrode 38 and plate electrode 42 may be generically referred to as being capacitor electrodes.

Capacitor 14 comprises capacitor dielectric 46 between the capacitor electrodes 38 and 42. The capacitor dielectric 46 is shown to comprise two different materials 48 and 50. In other embodiments, the capacitor dielectric may comprise only a single material, or may comprise more than two materials.

In some embodiments, the capacitor dielectric will include a metal oxide mixture that has a continuous concentration gradient of one component relative to another. Specifically, a dielectric composition with a high dielectric constant (for instance, a dielectric composition selected from the group consisting of niobium oxide, titanium oxide, strontium oxide and mixtures thereof) is mixed with a dielectric composition having a lower dielectric constant (for instance, a dielectric composition selected from the group consisting of zirconium oxide, hafnium oxide and mixtures thereof) to form a continuous concentration gradient of the high dielectric constant composition relative to the low dielectric constant composition.

The high dielectric constant composition will have a desired high dielectric constant, but will also tend to have undesired small bandgaps and corresponding high leakage characteristics. In contrast, the low dielectric constant composition will tend to have desired wide bandgaps and corresponding low leakage characteristics; but will also tend to have an undesired low dielectric constant. By combining the high dielectric constant composition with the low dielectric constant composition in a metal oxide mixture, the desired properties of each may be obtained across a thickness of the metal oxide mixture.

It may be advantageous for the highest concentration of the high dielectric constant composition to be near a capacitor electrode, and to then have the concentration of the high dielectric constant composition fall off as a distance from the capacitor electrode increases. In embodiments in which capacitor dielectric 46 comprises two or more different materials, the metal oxide mixture may be utilized as one of the materials of the capacitor dielectric, or as multiple materials of the capacitor dielectric. For instance, either or both of the dielectric materials 48 and 50 of capacitor dielectric 46 may be a metal oxide mixture.

In the shown embodiment, dielectric material 48 is adjacent storage node electrode 38. If material 48 is a mixture of a high dielectric constant composition and a low dielectric constant composition, the concentration of the high dielectric constant composition may increase along a continuous concentration gradient extending from an upper surface of material 48 to a lower surface of material 48, as indicated by an arrow 49 provided adjacent material 48. Similarly, if the dielectric material 50 is a mixture of a high dielectric constant composition and a low dielectric constant composition, the concentration of the high dielectric constant composition may increase along a continuous concentration gradient extending from a lower surface of material 50 to an upper surface of material 50, as indicated by a dashed-line arrow 51 provided adjacent material 50.

Capacitor 18 is similar to the above-discussed capacitor 14, and comprises a storage node electrode 52 in electrical connection with pedestal 37. Storage node electrode 52 may comprise any of the materials discussed above regarding storage node electrode 38, and is shown to homogeneously comprise the single material 40.

Capacitor 18 comprises the plate electrode 42 that was discussed above; and also comprises the capacitor dielectric 46 that was discussed above.

The diagram of FIG. 1 shows that the capacitor plate electrode may be distinguished from storage node electrodes of DRAM in that the capacitor plate electrode (specifically, electrode 42 of FIG. 1) is shared across numerous capacitors, while the storage node electrodes (specifically, electrodes 38 and 52 of FIG. 1) are unique to individual capacitors.

Each of the capacitors is electrically connected to one of the source/drain regions of a transistor (for instance, in the shown embodiment the source/drain regions 30 and 34 of transistors 16 and 20, respectively, are electrically connected to capacitors 14 and 18, respectively). The remaining source/drain region of the transistor may be electrically connected to a bitline. In FIG. 1, the shared source/drain region 32 of transistors 16 and 20 is diagrammatically illustrated as being electrically connected to a bitline 54. In operation, bitlines and wordlines may correspond to rows and columns of a memory array, and individual capacitors may be uniquely addressed at crosspoints of the rows and columns.

The construction 10 of FIG. 1 is a generic representation of a portion of a DRAM array, and numerous aspects of such construction may be varied in specific embodiments (not shown). In the shown embodiment, a block of electrically insulative material 56 is provided between capacitors 18 and 14 to electrically isolate the storage node electrodes of the capacitors from one another. The capacitors are shown having a simple geometric configuration of stacked plates, and the intervening insulative material 56 is shown having a simple geometric configuration of a contiguous block. In other embodiments, the capacitors may have more complex geometric configurations (for instance, the capacitors may be container-type capacitors or pedestal-type capacitors), and likewise material 56 may be formed in a more complex geometric configuration. Also, pedestals 36 and 37 may be omitted in some embodiments, so that storage nodes 38 and 52 are formed in direct physical contact with source/drain regions 30 and 34.

An additional modification that may be made relative to the construction 10 of FIG. 1 is that the capacitor dielectric 46 may be tailored for particular embodiments. FIGS. 2-9 illustrate particular configurations of capacitor dielectric 46 relative to example capacitors and methods of forming capacitors.

Figure 2:
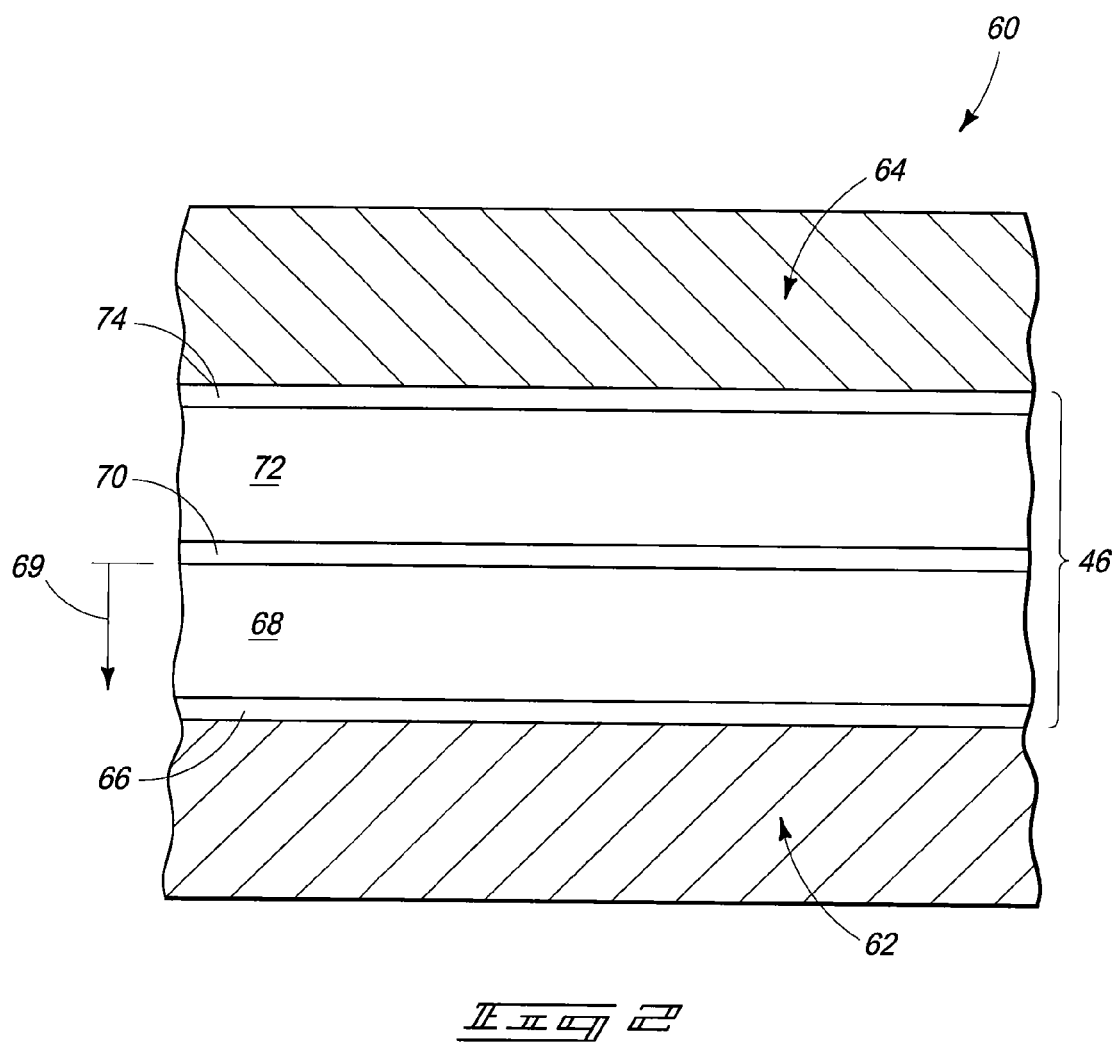
FIG. 2 is a diagrammatic cross-sectional side view of an example embodiment capacitor.

Referring to FIG. 2, a capacitor 60 is shown to comprise a pair of capacitor electrodes 62 and 64, and dielectric material 46 between the capacitor electrodes. One of the capacitor electrodes 62 and 64 may correspond to a storage node electrode analogous to the electrode 38 of FIG. 1, and the other of the electrodes 62 and 64 may correspond to a capacitor plate electrode analogous to the electrode 42 of FIG. 1. Either of the electrodes 62 and 64 may be the storage node electrode, and accordingly either of the electrodes 62 and 64 may be the capacitor plate electrode. The electrodes 62 and 64 may be referred to as a first capacitor electrode and a second capacitor electrode, respectively.

The dielectric material 46 of capacitor 60 contains materials 66, 68, 70, 72 and 74. The materials 66, 70 and 74 are shown to be thin layers, while the materials 68 and 72 are thicker layers. Dielectric material 46 may have any suitable overall thickness, and in some embodiments may have a thickness of from about 80 Å to about 150 Å.

The material 68 may be a metal oxide mixture comprising a continuous concentration gradient of one component relative to another. In some embodiments, the material 68 may be a mixture of a metal oxide having a high dielectric constant with a metal oxide having a low dielectric constant, with a concentration of the high dielectric constant metal oxide increasing along a continuous concentration gradient extending from an upper surface of material 68 to a lower surface of material 68, as indicated by an arrow 69 provided adjacent material 68. The metal oxide with the high dielectric constant may be selected from the group consisting of niobium oxide (i.e., $NbO_a$, where "a" is greater than zero), titanium oxide (i.e., $TiO_b$, where "b" is greater than zero), strontium oxide (i.e., $SrO_c$, where "c" is greater than zero) and mixtures thereof. The metal oxide with the low dielectric constant may be selected from the group consisting of zirconium oxide (i.e., $ZrO_d$, where "d" is greater than zero), hafnium oxide (i.e., $HfO_e$, where "e" is greater than zero) and mixtures thereof. Accordingly, in some embodiments material 68 may comprise, consist essentially of, or consist of a mixture of a first component selected from the group consisting of zirconium oxide, hafnium oxide and mixtures thereof; with a second component selected from the group consisting of niobium oxide, titanium oxide, strontium oxide and mixtures thereof.

The continuous concentration gradient within material 68 may be described as follows. The upper surface of material 68 may be considered to comprise a first atomic percentage of the high dielectric constant metal oxide (which in some embodiments may be 0 atomic percent, and in other embodiments may be greater than 0 atomic percent). The lower surface of material 68 may be considered to comprise a second atomic percentage of the high dielectric constant metal oxide. The second atomic percentage is greater than the first atomic percentage, and the atomic percentage of the high dielectric constant metal oxide increases continuously throughout a thickness of material 68.

In some embodiments, the high dielectric constant metal oxide consists of niobium oxide, and the low dielectric constant metal oxide consists of one or both of zirconium oxide and hafnium oxide. In such embodiments, the first atomic percentage of the niobium oxide may be less than or equal to 50 percent, and the second atomic percentage of the niobium oxide may be less than or equal to 100 percent. In the shown embodiment, the continuous concentration gradient of the niobium oxide within material 68 (illustrated by arrow 69) results in an increasing concentration of niobium oxide as a distance from the capacitor electrode 62 decreases.

The utilization of a continuous concentration gradient of the high dielectric constant metal oxide within material 68 may enable more of the high dielectric constant metal oxide to be effectively incorporated into material 68 than could be accomplished utilizing a non-continuous concentration gradient (such as a step gradient).

Material 68 may be formed to any suitable thickness. In some example embodiments, material 68 may have a thickness of from about 10 Å to about 70 Å; and in some example embodiments may have a thickness of about 30 Å.

Material 72 may comprise a dielectric material that is provided in addition to material 68 in order to tailor dielectric properties of material 46 to achieve specific desired parameters of the material 46. In some embodiments, material 72 may comprise, consist essentially of, or consist of one or both of hafnium oxide and zirconium oxide. In some embodiments, materials 68 and 72 may be referred to as first and second dielectric materials, respectively.

In some embodiments, materials 66, 70 and 74 may comprise, consist essentially of, or consist of aluminum oxide and may be utilized as barriers to impede migration of niobium, titanium and/or strontium from material 68. In such embodiments, materials 66, 70 and 74 may be formed to be less than 10 Å thick, less than 5 Å thick, or even less than 4 Å thick. One or more of the materials 66, 70 and 74 may be omitted in some embodiments.

Figure 3:
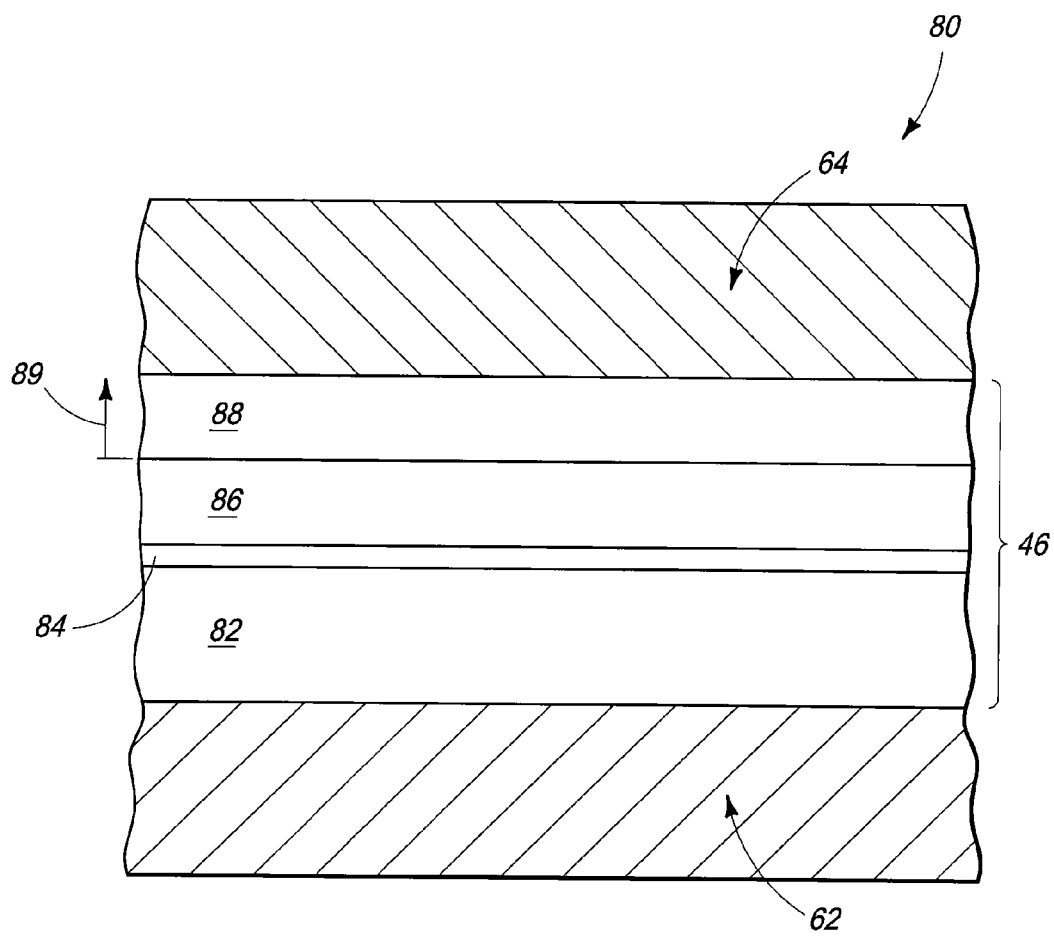
FIG. 3 is a diagrammatic cross-sectional side view of another example embodiment capacitor.

Referring to FIG. 3, a capacitor 80 is shown to comprise the pair of capacitor electrodes 62 and 64, discussed above with reference to FIG. 2, and to comprise dielectric material 46 between the capacitor electrodes. The capacitor dielectric 46 of capacitor 80 contains materials 82, 84, 86 and 88. An overall thickness of the material 46 of capacitor 80 may be from about 80 Å to about 150 Å.

Material 82 may comprise, consist essentially of, or consist of a mixture of aluminum and oxygen together with one or both of hafnium and zirconium; and specifically may comprise, consist essentially of, or consist of a mixture of aluminum oxide and one or both of hafnium oxide and zirconium oxide. Material 82 may be amorphous, rather than crystalline. Although material 82 is shown directly against bottom electrode 62, in other embodiments there may be an intervening thin layer of aluminum oxide provided between material 82 and the bottom electrode.

Material 84 may comprise, consist essentially of, or consist of aluminum oxide, and may have a thickness of less than 10 Å, less than 5 Å, or less than or equal to 4 Å in some embodiments. Material 84 may be omitted in some embodiments.

Material 86 may comprise, consist essentially of, or consist of one or both of zirconium oxide and hafnium oxide, and may be crystalline.

Material 88 may be a metal oxide mixture comprising a continuous concentration gradient of one component relative to another, and may be identical to the material 68 discussed above with reference to FIG. 2. An arrow 89 is provided adjacent material 88 to illustrate a concentration gradient of a high dielectric constant component within material 88. Material 88 may be crystalline, amorphous, or a combination of crystalline and amorphous.

Although either of capacitor electrodes 62 and 64 may be the storage node electrode of the capacitor, in some embodiments it may be advantageous for electrode 62 to be the storage node electrode in the configuration shown in FIG. 3.

Figure 4:
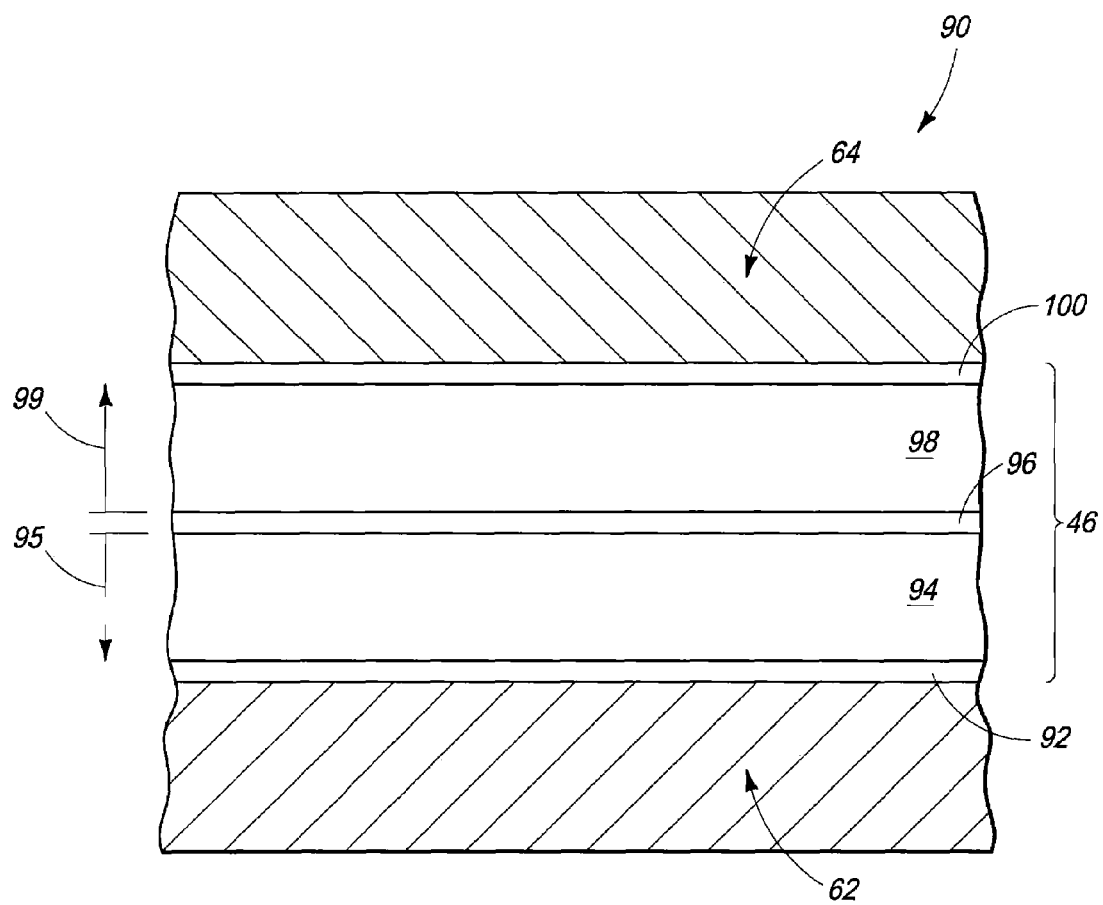
FIG. 4 is a diagrammatic cross-sectional side view of another example embodiment capacitor.

The capacitors of FIGS. 2 and 3 are asymmetric relative to the distribution of capacitor dielectric between the capacitor electrodes. FIG. 4 illustrates an alternative capacitor 90 that has a symmetric distribution of capacitor dielectric between the capacitor electrodes 62 and 64.

The capacitor dielectric 46 of capacitor 90 contains materials 92, 94, 96, 98 and 100.

Materials 94 and 98 may be metal oxide mixtures comprising continuous concentration gradients of one component relative to another, and may be identical to the material 68 discussed above with reference to FIG. 2. In some embodiments, the materials 94 and 98 may be compositionally identical to one another, and may be mirror images of one another. An arrow 95 is provided adjacent material 94 to illustrate a concentration gradient of a high dielectric constant component within material 94, and an arrow 99 is provided adjacent material 98 to illustrate a concentration gradient of a high dielectric constant component within material 98. Arrow 95 shows the concentration of the high dielectric constant component in material 94 increasing in a direction toward the illustrated bottom electrode 62. In contrast, arrow 99 shows the concentration of the high dielectric constant component in material 98 increasing in a direction toward the illustrated top electrode 64.

In some embodiments, the components of the mixed metal oxide of material 94 may be referred to as a first component and a second component; with the first component being one or more low dielectric constant compositions (such as one or both of hafnium oxide and zirconium oxide), and the second component being one or more high dielectric constant compositions (such as one or more of niobium oxide, titanium oxide and strontium oxide). In such embodiments, the components of the mixed metal oxide of material 98 may be referred to as a third component and a fourth component; with the third component being one or more low dielectric constant compositions, and the fourth component being one or more high dielectric constant compositions. The first and third components may be the same as one another in some embodiments, or may be different from one another in other embodiments. Similarly, the second and fourth components may be the same as one another in some embodiments, or may be different from one another in other embodiments.

Materials 92, 96 and 100 may comprise, consist essentially of, or consist of aluminum oxide, and may have thickness of less than 10 Å, less than 5 Å, or less than or equal to 4 Å in some embodiments. One or more of materials 92, 96 and 100 may be omitted in some embodiments.

The capacitors of FIGS. 1-4 may be formed with any suitable methodology. An example method for forming the capacitor 60 of FIG. 2 is described with reference to FIGS. 5-7.

Referring to FIG. 5, construction 60 is shown at a processing stage after material 66 has been formed across the illustrated bottom electrode 62. The bottom electrode may be formed over a supporting substrate (not shown) utilizing one or more of physical vapor deposition (PVD), atomic layer deposition (ALD) and chemical vapor deposition (CVD).

Material 66 may be deposited over electrode 62 utilizing one or both of ALD and CVD. For instance, if material 66 consists of aluminum oxide, such may be formed by ALD utilizing sequential pulses of an aluminum-containing precursor and an oxygen-containing precursor. In the shown embodiment, material 66 is directly against (i.e., touching) electrode 62.

Referring to FIG. 6, the metal oxide mixture of material 68 is formed over material 66. In the shown embodiment, material 68 is directly against material 66.

The metal oxide mixture of material 68 has two components, as discussed above with reference to FIG. 2. One of the components may be referred to as a first component, and may comprise one or both of zirconium oxide and hafnium oxide; and the other of the components may be referred to as a second component, and may comprise one or more of niobium oxide, titanium oxide and strontium oxide. The concentration of the second component increases continuously in progressing from an upper surface of material 68 to a lower surface of the material, as indicated by the arrow 69 provided adjacent material 68.

The metal oxide mixture of material 68 may be formed utilizing one or both of ALD and CVD. For instance, if CVD is utilized a mixture of precursors may be provided within a reaction chamber. One of the precursors may lead to formation of the first component of the metal oxide mixture of material 68, and a second of the precursors may lead to formation of the second component of the metal oxide mixture of material 68. The relative amount of the second component of the metal oxide mixture to the first component of the metal oxide mixture may be continuously varied by continuously altering the ratio of the second precursor to the first precursor within the deposition chamber.

If ALD is utilized to form material 68, the material will be formed as a plurality of separate layers which are then diffused into one another with a subsequent anneal. Thus, material 68 may be initially formed as a stack of thin layers deposited with ALD. Some layers may comprise the first component of the metal oxide mixture material 68, while others of the layers comprise the second component of such metal oxide mixture. The relative amount of the second component to the first component may be varied within the stack by altering the number of layers corresponding to the first component relative to the number of layers corresponding to the second component. Prior to the anneal of the deposited layers, the bottom of material 68 will comprise a higher percentage of layers containing a second component of the metal oxide mixture than will the top of material 68, and the percentage of layers containing a second component of the metal oxide mixture will vary throughout the stack. After annealing of the stack and the accompanying diffusion of the layers into one another, material 68 will have a continuously varying gradient corresponding to the concentration of the second component of the metal oxide mixture relative to the first component of the metal oxide mixture.

In some embodiments, the ALD may comprise sequential pulses of metal-containing precursor and oxygen-containing precursor to form a stack of metal oxide layers. In other embodiments, the ALD may utilize sequential pulses of a first metal-containing precursor, a second metal-containing precursor, and an oxygen-containing precursor (a so-called "MMO" pulse) to form at least some of the layers within the stack to contain two or more metals in combination with oxygen. If the ALD utilizes MMO pulses, individual layers formed by the ALD may contain both the second component of the metal oxide mixture and the first component of the metal oxide mixture. In such embodiments, the concentration of the second component of the metal oxide mixture may be varied by changing a relative amount of the second component of the metal oxide mixture to the first component of the metal oxide mixture within individual layers.

Figure 7:
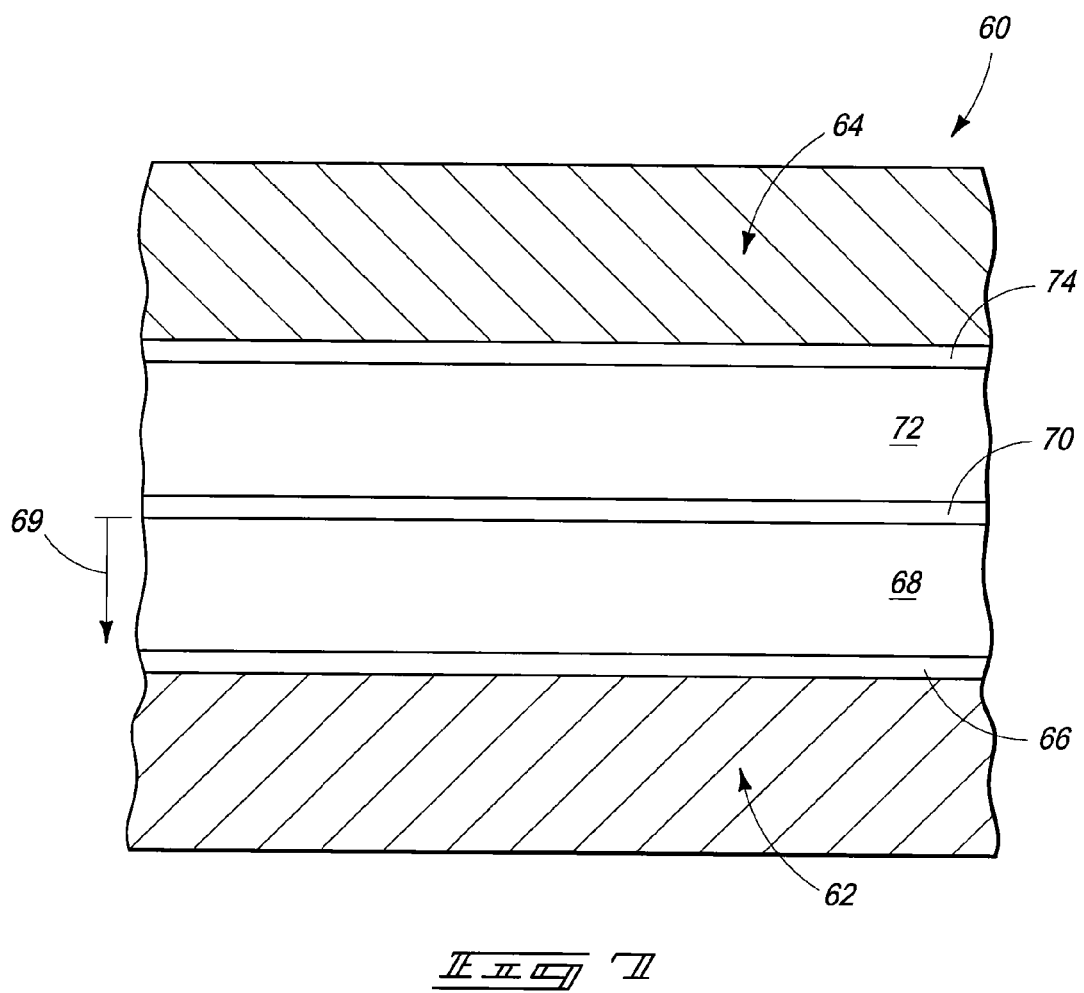

Referring to FIG. 7, the materials 70, 72 and 74 are formed over material 68; and the top electrode 64 is formed over material 74. The various materials 70, 72, 74 may be formed utilizing any suitable processing, including, for example, one or both of ALD and CVD; and the top electrode 64 may be formed utilizing one or more of ALD, CVD and PVD.

An example method for forming the capacitor 90 of FIG. 4 is described with reference to FIGS. 8 and 9.

Referring to FIG. 8, construction 90 is shown at a processing stage after material 92 has been formed across the illustrated bottom electrode 62, and after material 94 has been formed over material 92.

The bottom electrode 62 may be formed over a supporting substrate (not shown) utilizing one or more of physical vapor deposition (PVD), atomic layer deposition (ALD) and chemical vapor deposition (CVD).

Material 92 may be deposited over electrode 62 utilizing one or both of ALD and CVD. For instance, if material 92 consists of aluminum oxide, such may be formed by ALD utilizing sequential pulses of an aluminum-containing precursor and an oxygen-containing precursor.

The metal oxide mixture of material 94 may be formed utilizing processing analogous to that discussed above with reference to FIG. 6 relative to formation of material 68.

Referring to FIG. 9, the materials 96, 98 and 100 are formed over material 94; and the electrode 64 is formed over material 100. Material 98 may be formed utilizing processing analogous to that discussed above with reference to FIG. 6 relative to formation of material 68. The materials 96 and 100 may be formed utilizing any suitable processing, including, for example, one or both of ALD and CVD; and the top electrode 64 may be formed utilizing one or more of ALD, CVD and PVD.

The processing of FIGS. 5-9 forms the capacitor 60 that had been described with reference to FIG. 2, and the capacitor 90 that had been described with reference to FIG. 4. Processing analogous to that of FIGS. 5-9 may be used to form the capacitor 80 of FIG. 3. Specifically, materials 82, 84 and 86 of FIG. 3 may be formed with any suitable processing, such as, for example, one or both of ALD and CVD; and material 88 of FIG. 3 may be formed with processing analogous to that discussed above with reference to FIG. 6 relative to formation of material 68.

In compliance with the statute, the subject matter disclosed herein has been described in language more or less specific as to structural and methodical features. It is to be understood, however, that the claims are not limited to the specific features shown and described, since the means herein disclosed comprise example embodiments. The claims are thus to be afforded full scope as literally worded, and to be appropriately interpreted in accordance with the doctrine of equivalents.

We claim:

1. A capacitor, comprising:
   a first capacitor electrode;
   a second capacitor electrode;
   a capacitor dielectric material between the first and second capacitor electrodes; the capacitor dielectric material comprising a metal oxide mixture; the metal oxide mixture comprising a continuous concentration gradient of a second component relative to a first component; the first component being selected from the group consisting of zirconium oxide, hafnium oxide and mixtures thereof; the second component being selected from the group consisting of niobium oxide, titanium oxide, strontium oxide and mixtures thereof; and
   wherein the continuous concentration gradient comprises an increasing concentration of the second component as a distance from one of the capacitor electrodes decreases.

2. The capacitor of claim 1 further comprising a layer consisting of aluminum oxide between the first capacitor dielectric material and the first capacitor electrode.

3. The capacitor of claim 1 wherein the capacitor dielectric material is a first capacitor dielectric material; wherein said one of the capacitor electrodes is the first capacitor electrode; and further comprising a second capacitor dielectric material between the first capacitor dielectric material and the second capacitor electrode; the second dielectric material consisting of one or both of hafnium oxide and zirconium oxide.

4. A capacitor, comprising:
   a first capacitor electrode;
   a second capacitor electrode;
   a capacitor dielectric material between the first and second capacitor electrodes; the capacitor dielectric material comprising a metal oxide mixture; the metal oxide mixture comprising a continuous concentration gradient of a second component relative to a first component; the first component being selected from the group consisting of zirconium oxide, hafnium oxide and mixtures thereof; the second component being selected from the group consisting of niobium oxide, titanium oxide, strontium oxide and mixtures thereof;
   wherein the continuous concentration gradient comprises an increasing concentration of the second component as a distance from one of the capacitor electrodes decreases;
   wherein the capacitor dielectric material is a first capacitor dielectric material; wherein said one of the capacitor electrodes is the first capacitor electrode; and further comprising a second capacitor dielectric material between the first capacitor dielectric material and the second capacitor electrode; the second dielectric material consisting of one or both of hafnium oxide and zirconium oxide; and
   further comprising a third capacitor dielectric material between the second capacitor dielectric material and the second capacitor electrode; the third dielectric material consisting of aluminum oxide in combination with one or both of hafnium oxide and zirconium oxide.

5. The capacitor of claim 4 further comprising a layer consisting of aluminum oxide between the second capacitor dielectric material and the third capacitor dielectric material.

6. A capacitor, comprising:
   a first capacitor electrode;
   a second capacitor electrode;
   a pair of capacitor dielectric materials between the first and second capacitor electrodes; one of the capacitor dielectric materials being adjacent the first capacitor electrode and being a first capacitor dielectric material; another of the capacitor dielectric materials being adjacent the second capacitor electrode and being a second capacitor dielectric material;
   the first capacitor dielectric material comprising a first metal oxide mixture; the first metal oxide mixture comprising a first continuous concentration gradient of a second component relative to a first component; the first component being selected from the group consisting of zirconium oxide, hafnium oxide and mixtures thereof; the second component being selected from the group consisting of niobium oxide, titanium oxide, strontium oxide and mixtures thereof; the first continuous concentration gradient comprising an increasing concentration of the second component as a distance from the first capacitor electrode decreases; and
   the second capacitor dielectric material comprising a second metal oxide mixture; the second metal oxide mixture comprising a second continuous concentration gradient of a fourth component relative to a third component; the third component being selected from the group consisting of zirconium oxide, hafnium oxide and mixtures thereof; the fourth component being selected from the group consisting of niobium oxide, titanium oxide, strontium oxide and mixtures thereof; the second continuous concentration gradient comprising an increasing concentration of the fourth component as a distance from the second capacitor electrode decreases.

7. The capacitor of claim 6 wherein the third component is identical in composition to the first component; and wherein the fourth component is identical in composition to the second component.

8. The capacitor of claim 6 further comprising a layer consisting of aluminum oxide between the first and second capacitor dielectric materials.

* * * * *